(12) United States Patent
Venkat et al.

(10) Patent No.: US 7,751,318 B2
(45) Date of Patent: Jul. 6, 2010

(54) METHOD AND SYSTEM FOR COMPUTING AS-DISJOINT INTER-AS TRAFFIC ENGINEERING-LABEL SWITCHED PATHS (TE-LSPS)

(75) Inventors: Balaji Venkat, Chennai (IN); Ashok Vishwanath Rajagopalan, Chennai (IN); Bhargav Bhikkaji, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 469 days.

(21) Appl. No.: 11/509,415

(22) Filed: Aug. 23, 2006

(65) Prior Publication Data

US 2008/0049751 A1 Feb. 28, 2008

(51) Int. Cl.
*H04L 12/26* (2006.01)
*H04L 12/56* (2006.01)

(52) U.S. Cl. ........................ 370/230; 370/252; 370/401

(58) Field of Classification Search ......... 370/230–234, 370/252–255, 400, 401
See application file for complete search history.

(56) References Cited

U.S. PATENT DOCUMENTS

| | | | | |
|---|---|---|---|---|
| 6,553,423 | B1* | 4/2003 | Chen | 709/230 |
| 6,693,878 | B1* | 2/2004 | Daruwalla et al. | 370/235 |
| 6,970,464 | B2* | 11/2005 | Xu et al. | 370/392 |
| 7,035,934 | B1* | 4/2006 | Lin | 709/238 |
| 7,180,866 | B1* | 2/2007 | Chartre et al. | 370/242 |
| 7,302,494 | B2* | 11/2007 | Hayashi et al. | 709/239 |
| 7,460,481 | B2* | 12/2008 | Vasseur et al. | 370/238 |
| 2004/0184408 | A1* | 9/2004 | Liu et al. | 370/236 |
| 2004/0264465 | A1* | 12/2004 | Dunk | 370/392 |
| 2007/0133406 | A1* | 6/2007 | Vasseur | 370/230 |
| 2007/0208871 | A1* | 9/2007 | Vasseur et al. | 709/230 |
| 2007/0217419 | A1* | 9/2007 | Vasseur | 370/392 |

OTHER PUBLICATIONS

JP. Vasseur, Ed., A. Ayyangar, Ed., R. Zhang, A Per-Domain Path Computation Method for Establishing Inter-Domain Traffic Engineering (TE) Label Switched Paths (LSPs), Internet Engineering Task Force (IETF), Feb. 7, 2006 found at: http://www.ietf.org/ietf/1id-abstracts.txt, 30 pages.
K. Kompella, Y. Rekhter, Label Switched Paths (LSP) Hierarchy with Generalized Multi-Protocol Label Switching (GMPLS) Traffic Engineering (TE), RFC 4206, The Internet Society, Oct. 2005, 14 pages.
D. Awduche, L. Berger, D. Gan, T. Li, V. Srinivasan, and G. Swallow, RSVP-TE: Extensions to RSVP for LSP Tunnels, The Internet Society, Dec. 2001, found at http://www.ietf.org/rfc/rfc3209.txt, 57 pages.
J.-L. Le Roux, Ed., J.-P. Vasseur, Ed., J. Boyle, Ed., Requirements for Inter-Area MPLS Traffic Engineering, The Internet Society, Jun. 2005, found at http://rfc.net/rfc4105.html, 23 pages.
R. Zhang, Ed., J.-P. Vasseur, Ed., MPLS Inter-Autonomous System (AS) Traffic Engineering (TE) Requirements, The Internet Society, Nov. 2005, found at http://rfc.net/rfc4216.html 30 pages.

* cited by examiner

*Primary Examiner*—Hong Cho
(74) *Attorney, Agent, or Firm*—Trellis IP Law Group, PC

(57) ABSTRACT

Methods and systems have been provided for constructing autonomous system (AS)-disjoint Traffic Engineering LSPs for load-balancing and protection purposes using AS-Level topology information in a network. The constructed network paths through a plurality of domains may be disjoint or partially disjoint.

10 Claims, 5 Drawing Sheets

METHOD AND SYSTEM FOR COMPUTING AS-DISJOINT INTER-AS TRAFFIC ENGINEERING-LABEL SWITCHED PATHS (TE-LSPS)

BACKGROUND OF THE INVENTION

1. Field of Invention

Embodiments of the invention relate to a routing mechanism in communication networks such as the Internet. More specifically, embodiments of the invention relate to mechanisms and methods for constructing Autonomous System (AS) disjoint Traffic Engineering Label Switched Path (TE-LSP) over a computer or telecommunications network.

2. Description of the Background Art

With increased network traffic, Internet service providers (ISPs) have increasingly turned to Traffic Engineering Label Switched Path (TE-LSP) to overcome bandwidth constraints and direct network traffic to under utilized paths. Traffic engineering also provides the ISP a mechanism to analyze current traffic loads and direct traffic flow onto paths that would otherwise remain underutilized.

With TE-LSP, an ISP is able to map traffic onto the existing physical topology and to move traffic flow away from the shortest, lowest cost metrics, path to under-utilized paths. This allows the ISP to better utilize their entire network capacity.

Current mechanisms for building inter-domain TE-LSPs involve constructing separate sections of a path through each AS using Interior Gateway Protocol (IGP) or Interior Border Gateway Protocol (iBGP). After the traffic traverses an AS, it is handed off to the next AS which constructs, in turn, a path through the AS to the next intermediate AS and so on until a path, spanning multiple ASs, is constructed from the source to the destination while avoiding network bottlenecks.

While TE-LSP provides the ISP a mechanism to achieve effective utilization of network resources within the domain, a bottleneck may develop in another intermediate ASs that can delay the traffic. To avoid that problem, it is necessary to construct multiple dis-joint paths from the source to the destination. However, the PCE constructs only a single TE-LSP so the risk of a problem in one domain affecting timely delivery of the traffic is still quite high. Further, current TE-LSP are not flexible enough to construct AS-disjoint TE-LSPs to act as a backup TE-LSP that traverses none of the intermediate ASs traversed by the primary TE-LSP.

What is needed is a mechanism that enables ISPs to construct multiple AS-disjoint TE-LSPs to better control network traffic flow, to load balance traffic along various paths through each domain and to provide reliable backup transport should an AS on the single TE-LSP experience a disruption. There is also a need for a mechanism that can construct AS disjoint paths such that the head-end AS can define two TE-LSPs that traverse different intermediate ASs to reach a common destination. More specifically, what is needed is the ability to construct both a primary TE-LSP and a backup TE-LSP that traverses none of the intermediate ASs that the primary TE-LSP traverses. What is still further needed is a mechanism that enables ISPs to construct a partially disjoint backup TE-LSP when dictated by engineering considerations. What is still further needed is a mechanism that can load balance traffic across multiple TE-LSPs that are either fully or partially disjoint.

DETAILED DESCRIPTION OF EMBODIMENTS OF THE INVENTION

Figure 1:
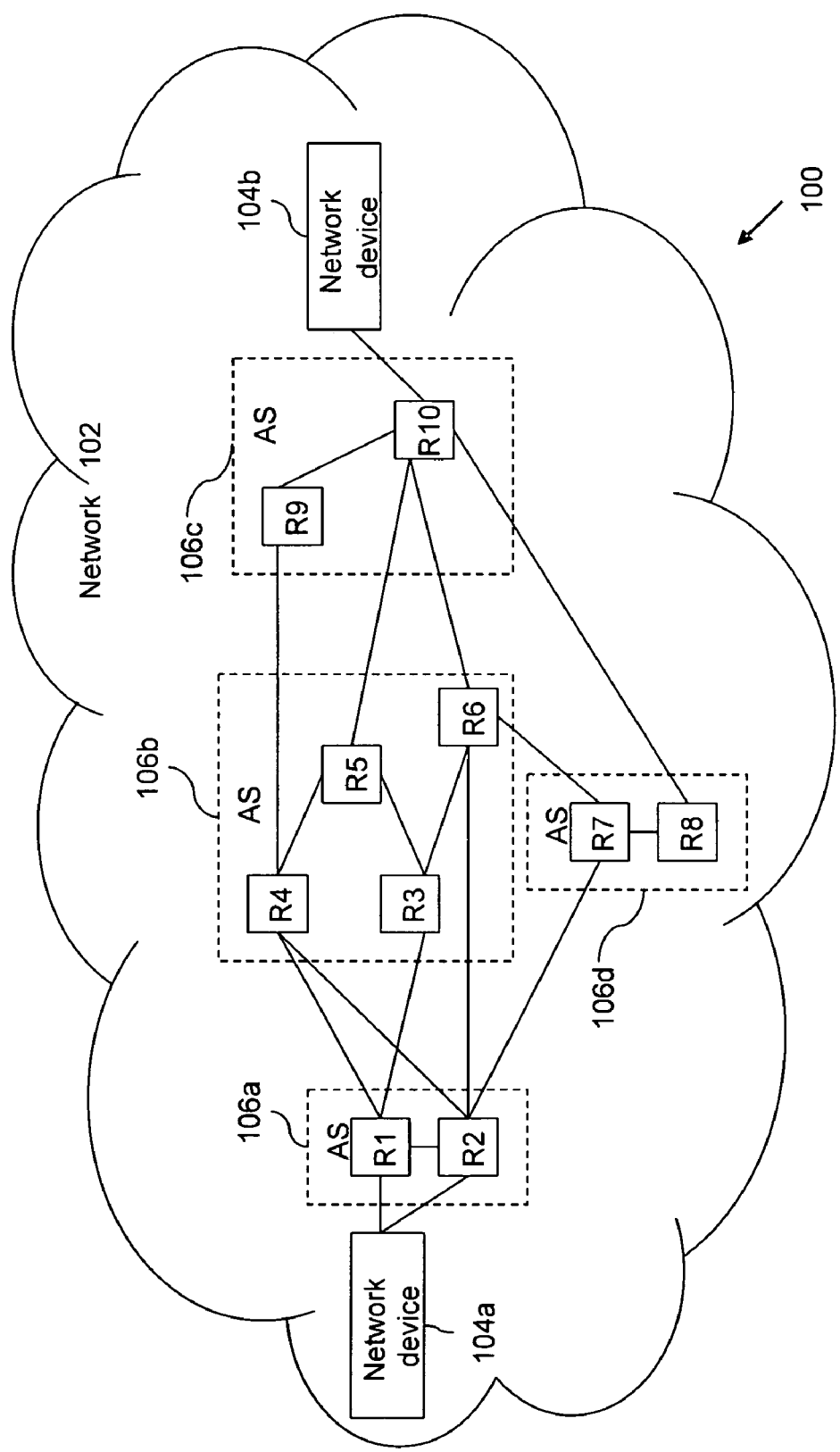
FIG. 1 illustrates an environment for computing Autonomous System (AS)-disjoint inter-AS Traffic Engineering Label Switched Paths (TE-LSPs) in accordance with an embodiment of the invention.

Embodiments of the invention provide methods and systems for constructing Autonomous Systems (AS)-disjoint traffic engineering label switched paths (TE-LSPs) across multiple domains. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Modern communication networks such as the Internet or other switched networks, typically comprise multiple domains, one example of which is an Autonomous System (AS). Each AS includes a collection of network devices, such as routers and switches, within a common sphere of address management and subject to a defined routing policy. Routing protocols, such as OSPF/IS-IS and Border Gateway Protocol (BGP), determine an appropriate path for forwarding network traffic through the AS and then on to the destination. The routing protocols also dynamically adjust routing paths in response to changing network conditions, such as, by way of example, failure on a link or a router failure. OSPF refers to the Open Shortest Path First protocol which is an interior gateway routing protocol developed for IP networks based on the shortest path first or link-state algorithm. IS-IS is a similar protocol in terms of capabilities that refers to Intermediate System-Intermediate System, an International Organization for Standardization (ISO) dynamic routing specification. BGP is just one common scalable routing protocol, developed by the Internet Engineering Task Force (IETF), that is capable of spanning multiple ASs. However, one of ordinary skill in art will understand that other routing protocols may be used either alone or in combination in accordance with the present invention. By way of illustration, an interior gateway protocol, such as OSPF or IS-IS, may be used for determining an appropriate path through an AS while from one AS to another AS, an exterior gateway protocol, such as BGP may be used to forward traffic headed for a destination reachable through multiple AS hops.

In accordance with an embodiment of the present invention, a mechanism and method are provided for constructing multiple AS-disjoint TE-LSPs when requested by a head end label switched router (LSR). More specifically, in a Multiprotocol Label Switching (MPLS) network, the LSR may require some traffic riding atop a primary TE-LSP to be protected by a backup TE-LSP that traverses none of the intermediate ASs that primary TE-LSP traverses.

In another embodiment, the LSE may specify that a plurality of TE-LSPs be constructed across the ASs in the network to the destination where subsets of the plurality of TE-LSPs traverse the Internet across multiple intermediate domains that are disjoint from the ASs traversed by other subsets of TE-LSPs. Advantageously, in accordance with the present invention, the traffic on the plurality of TE-LSPs is load balanced across the plurality of TE-LSPs. It is a further advantage that the TE-LSP subsets may be utilized for protection against lost packets and network disruptions or to provide a backup path should there by network disruptions or congestion.

In yet another embodiment, the LSE may specify that a plurality of TE-LSPs be constructed across the ASs in the network to the destination where subsets of the plurality of TE-LSPs traverse the internet across multiple intermediate domains that are partially disjoint from the ASs traversed by the other subsets of TE-LSPs. Again, in accordance with the present invention, the traffic on the plurality of TE-LSPs is load balanced across the plurality of TE-LSPs. Advantageously, these TE-SLSPs subsets may be used for protection or backup paths.

Referring now to the drawings, more particularly by their reference numbers, FIG. 1 illustrates a network environment 100 over which AS-disjoint inter-AS Traffic Engineering Label Switched Paths (TE-LSPs) are computed in accordance with an embodiment of the invention. Environment 100 includes network 102, network devices 104, such as a server or host operated by an Internet service provider (ISP), and Autonomous Systems (AS) 106, which is sometimes referred to as a routing domain. For the purpose of illustration herein, network device 104a is also referred as the source for the network traffic and network device 104b is also referred as the destination for the network traffic although such designation is solely for convenience and is not intended to limit the functionality of either network device 104.

Each AS 106 includes a plurality of Label Switch Routers (LSR) and other network infrastructure devices. For example, AS 106b comprises a plurality of switches, edge routers (not illustrated) and LSRs R2, R3, R4, and R5. Preferably, each of the LSRs is a type of a router located in the middle of a Multiprotocol Label Switching (MPLS) network responsible for switching the labels used to route packets or other network traffic. More specifically, when a LSR receives a packet, it uses the label included in the packet header as an index to determine the next hop on the Label Switched Path (LSP) and a corresponding label for the packet from a look-up table. The LSR then removes the old label from the header and replaces it with the new label before routing the packet forward to the destination.

Each AS 106 is either a single network or a group of networks controlled by a common network administrative entity such as a university or a business enterprise such as an Internet Service Provider (ISP) and assigned an autonomous system number that uniquely identifies the AS in the network. Networks within an AS communicate routing information to each other using an Interior Gateway Protocol (IGP). IGP is a well known protocol for distributing routing information to the routers in a common domain and is not further described.

An AS shares routing information with other ASs using BGP. It is to be understood that other protocols could be used. Further, one skilled in the art will appreciate that FIG. 1 is merely a representation of a simplified network for purpose of illustrating the present embodiment and the present invention is not to be limited by the number of illustrated ASs or network devices.

In operation, when mission critical information needs to be communicated from a network device, such as network device 104a to another network device, such as network device 104b, a label switched router within the head end AS 106a computes more than one AS-disjoint TE-LSP to the destination. To illustrate, a primary TE-LSP is constructed with LSRs R1, R4, R9, and R10 while a backup TE-LSP is constructed with LSRs R2, R7, R8, and R10. As used herein, an AS that receives a request for computing paths for network traffic is referred to as the head-end AS, and AS 106c through which the network traffic reaches the destination is referred to as a tail end AS. Any AS, such as ASs 106b and 106d, that lie between the head-end AS and the tail end AS in a TE-LSP is referred to an intermediate AS.

Figure 2:
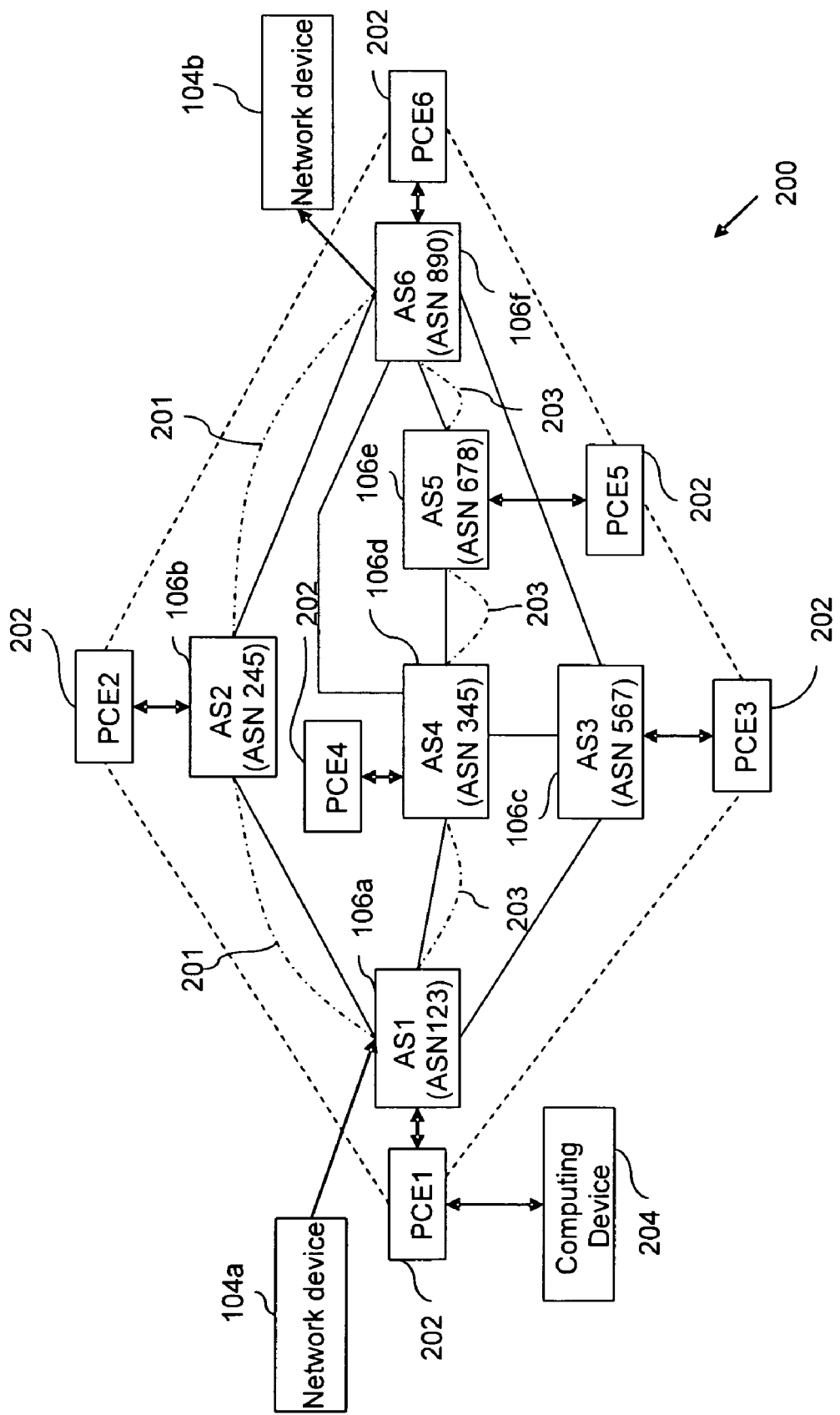
FIG. 2 illustrates an AS-disjoint TE-LSP in accordance with an embodiment of the invention.

FIG. 2 is another illustration of network environment 200 over which AS-disjoint inter-AS Traffic Engineering Label Switched Paths (TE-LSPs) are computed in accordance with an embodiment of the invention. TE-LSPs are considered to be AS-disjoint TE-LSPs when each computed path traverses different intermediate ASs. To illustrate, a primary path, shown by dash-dot path indicator 201, starts at network device 104a and traverses head end AS1 106a, intermediate AS2 106b, and tail end AS6 106f before arriving at the destination, network device 104b. A secondary or backup path, shown by dash-dot path indicator 203, also starts with network device 104a and also traverses head end AS1 106a and tail end cAS6 106f to reach destination network device 104b but traverses the disjoint intermediate domains of AS4 106d and AS5 106e. Advantageously with the present invention, it is possible to construct AS-disjoint Traffic Engineering LSPs for both load-balancing and backup purposes using AS-Level topology information.

Unlike the prior art mechanisms, the present invention provides the flexibility to build AS-disjoint TE-LSPs when the head end LSR in AS 1 106a requires traffic riding atop this TE-LSP to be protected by a secondary or backup TE-LSP that traverses none of the intermediate ASes that the primary TE-LSP traverses. When the nature of the network traffic that require priority treatment arrive at the LSR, that traffic can be sent down the primary path and the remaining "best efforts" traffic can be load balanced on the secondary AS-disjoint path. Further, should one of the intermediate ASs incurs a service disruption, traffic can be re-directed to the secondary AS-disjoint path.

To calculate the primary and the secondary TE-LSP, each AS 106 includes a Path Computation Element (PCE) 202, which may be a network device or component, such as a server or host, or an application executed by a LSR or other network device in the AS. PCE 202, associated with the head end AS, computes the primary and the backup paths based on the network topology obtained by either actively or passively participating or listening to BGP updates broadcast by its peers.

Because of the computational overhead requested to compute the primary and the secondary TE-LSP, in one embodiment of the present invention, PCE 202 may pass the computational task to a computing device 204 dedicated to computing the paths based on AS-level topology information obtained from a BGP routing table. One of skill in the art will appreciate that computing device may be an add-on line card that co-resides with a router but includes a dedicated processor and memory for performing the computational tasks and for accessing the router's BGP routing table. In another embodiment of the invention, computing device 204 is a device, co-resident with PCE 202, but again includes its own dedicated processor and memory and access to the BGP routing table. In yet another embodiment of the invention, computing device 204 can be a stand-alone device, with external BGP and internal BGP peering much like a router that passively participates in the BGP sessions for collecting AS-level topology information.

While the embodiment described in FIG. 2 illustrates the use of computing device 204, in other embodiments, a computation module (not shown) comprising executable code, may reside in PCE 202 or in one or more LSR in each domain. However, since the AS-disjoint paths computational algorithm requires substantial processor capacity, especially for large networks, it is preferred that such computations do not reside on the router control plane. Note that the computations to obtain an AS level topology for calculating the paths are preferably generated incrementally whenever there is a BGP AS path update, and periodically checked for consistency. Once computing device 204 had computed a consistent topology, the topology is provided as input to PCE 202 together with appropriate policies. Also note that explicitly routed AS-disjoint TE LSPs, specified through a strict AS path, would mean that the path information handed off to the neighboring AS would contain the explicit AS path information for the TE LSP to be so constructed at each stage.

Once computing device 204 collects the AS-level topology information for every route in the BGP routing table, computing device 204 has sufficient information to generate the AS topology. It is to be understood that the BGP routing table includes prefixes that contain the AS Path information that uniquely identify the AS and that provides the path through which network traffic is forwarded. Each prefix of the BGP routing table is referred to as a strand of information. For example, the prefixes in the BGP routing table are represented as follows:

prefix A: {Strand information of AS Path info: 123 345 890} prefix B: {Strand information of AS Path info: 123 345 678 890} prefix C: {Strand information of AS Path info: 123 345 567 890} prefix D: {Strand information of AS Path info: 123 345 567 890} prefix E: {Strand information of AS Path info: 123 567 890}

From the above strands it is possible to deduce the following AS topology in the neighboring ASs an AS hop or more from the current AS. Thus, computing device 204 need to merely combine the individual strands of information to generate an AS-level topology. PCE 202a at the head end AS then computes a sectional TE-LSP using the AS-level topology. PCE 202a sends the computed sectional TE-LSP to AS 1 106a. Thereafter, AS 1 106a contacts each intermediate ASs. The contact between two ASs may be established by communications protocols between the AS border routers in a manner that is well known in the art. Typically these AS border routers talk to each other using BGP to set up routing exchanges between ASes.

The neighboring ASs then request their corresponding PCE 202 to compute sectional TE-LSPs through each respective domain. The process follows till the network traffic reaches the tail end domain, AS6 106f, through which the destination is reachable. Note that the head-end AS and the tail-end AS in each of the two TE-LSPs are the same, and the intermediate ASs that are traversed by the paths 201 and 203 are different. Therefore, the two TE-LSPs are referred as AS-disjoint TE-LSPs.

Using the strand information available from the prefixes in the BGP routing table, it is possible to obtain a directed graph of the AS path information and, correspondingly, the AS-level topology of the neighboring ASs. Once this topology is determined, it is provided as input to the head end PCE, which then computes a set of AS-disjoint LSPs to provide for load-balancing and backup paths between the source and the destination.

In another embodiment of the invention, PCE 202 computes a partially AS-disjoint TE-LSPs for the network traffic. For example, one TE-LSP traverses path 203 while the secondary TE-LSP starts at network device 104a and traverses head end AS1 106a, intermediate domains AS4 106d and AS3 106c, and tail end AS6 106f before arriving at network device 104b. In the partially AS-disjoint TE-LSP, the head-end AS, tail-end AS and one or more of the traversed intermediate domains are the same. Since the primary and the secondary paths are only partially different, the two TE-LSPs are referred as partially AS-disjoint TE-LSPs.

Note that PCE to PCE communication is not one to one at the head-end AS. Rather, PCE to PCE communication is one to (n) at the head-end AS, where N can be less than or equal to the number of AS-disjoint TE-LSPs to be constructed. Following the head-end AS computation stage, PCE to PCE communication across the ASs is one to one along a single AS-disjoint TE-LSP path which is illustrated in FIG. 2 by the dashed lines connecting various PCEs.

Figure 3:
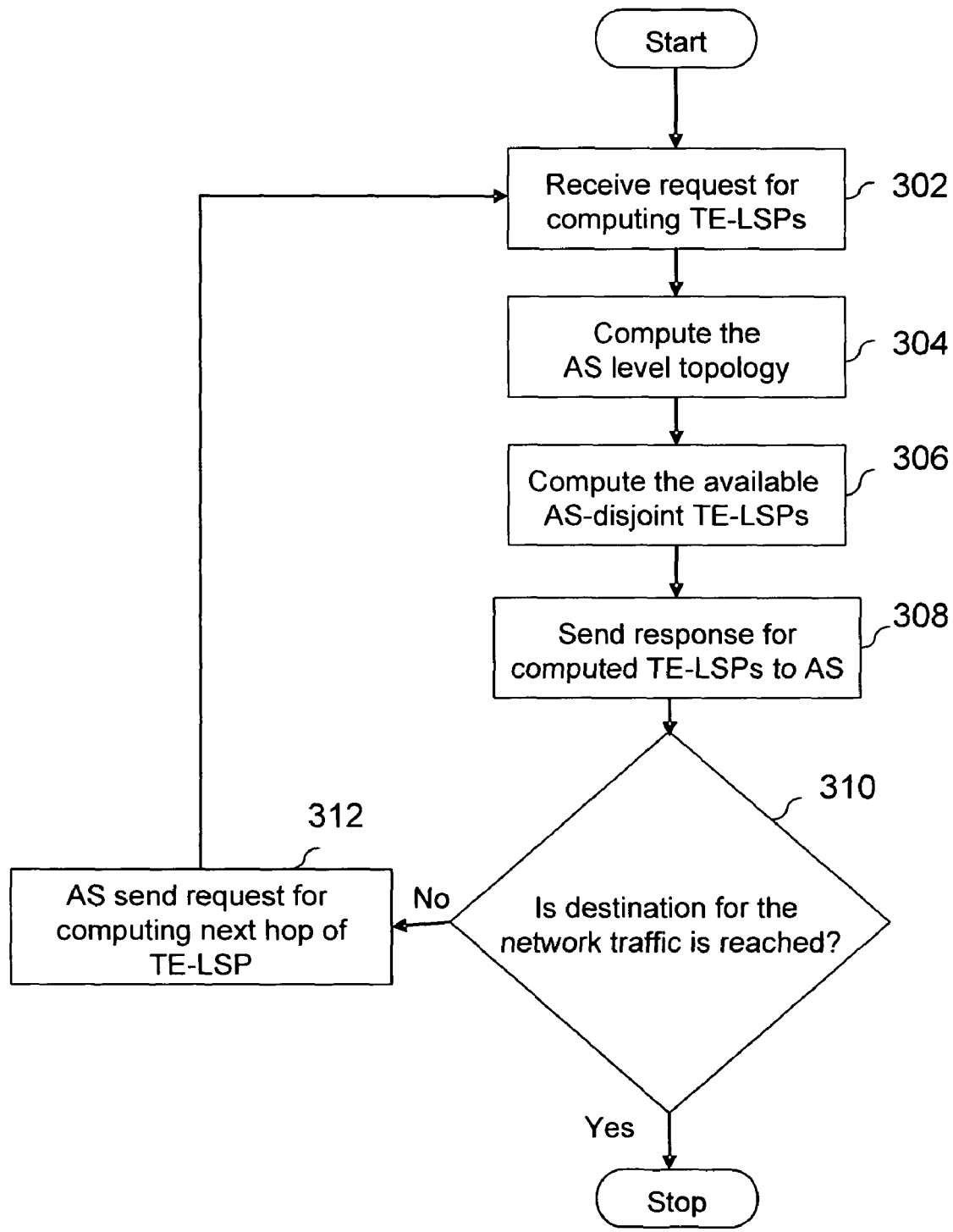
FIG. 3 is a flow diagram illustrating a method for computing AS-disjoint inter-AS TE-LSPs in accordance with an embodiment of the invention.

FIG. 3 is a flow diagram, illustrating a method for computing AS-disjoint inter-AS Traffic Engineering Label Switched Paths (TE-LSPs), in accordance with an embodiment of the present invention. The computation of several TE-LSPs help in load balancing of the network traffic based on the various network traffic constraints.

One method for performing load balancing begins at 302, where PCE 202 receives a request from AS 106a for computation of a selected number of AS-disjoint TE-LSPs. The number of AS-disjoint TE-LSPs may depend on the traffic constraints, which include bandwidth requirement, a maximum possible time delay and optimization of the available network resources or other criteria set forth in a Service Level Agreement (SLA). When AS-disjoint TE-LSPs are requested for the purpose of load balancing, traffic is routed to fulfill the traffic constraints or other SLA requirements. One or more of the TE-LSPs may be designated as a backup path to be used in the event of a malfunction of the one of the ASs in the primary TE-LSP. Advantageously, when a malfunction occurs, traffic switches from the primary TE-LSP to the backup TE-LSP. Because the backup TE-LSP does not comprise the same intermediate ASs that are traversed by the TE-LSP comprising the malfunctioned AS, it is possible for the ISP to efficiently fulfill its SLA obligations.

Once the number of TE-LSPs are determined, computing device 204 computes an AS level topology at 204. Thereafter, at 306, PCE 202 computes the available number of sectional AS-disjoint TE-LSPs based on the AS level topology. The sectional TE-LSP can be defined as a part of a complete TE-LSP through which a next AS in the network is reachable. Subsequently, at 308, PCE 202 sends a response to AS 106a about the computed sectional TE-LSP. If the destination for network traffic is reached, then the process for computing TE-LSPs is completed as indicated at 310. Otherwise, at 312, AS 1 106a contacts the neighboring AS2 106b and AS4 106d for setting up a next hop in the TE-LSP for constructing the entire network path. Paths to neighboring AS2 106b and AS4 106d are determined from the strands of information of the BGP routing table by computing device 204. The contact between two ASes is established using the border routers in the concerned ASes through communication protocols, such as BGP, Thereafter, the process for computing the entire TE-LSP is repeated by ASs neighboring AS1 106a. For example, AS2 106b requests PCE 202b to compute sectional TE-LSPs for AS2 106b so that the network traffic can reach AS 106f. Once the primary and secondary paths are set up, the traffic can be balanced across the AS-disjoint TE-LSPs in a manner that is well known in the art.

Figure 4:
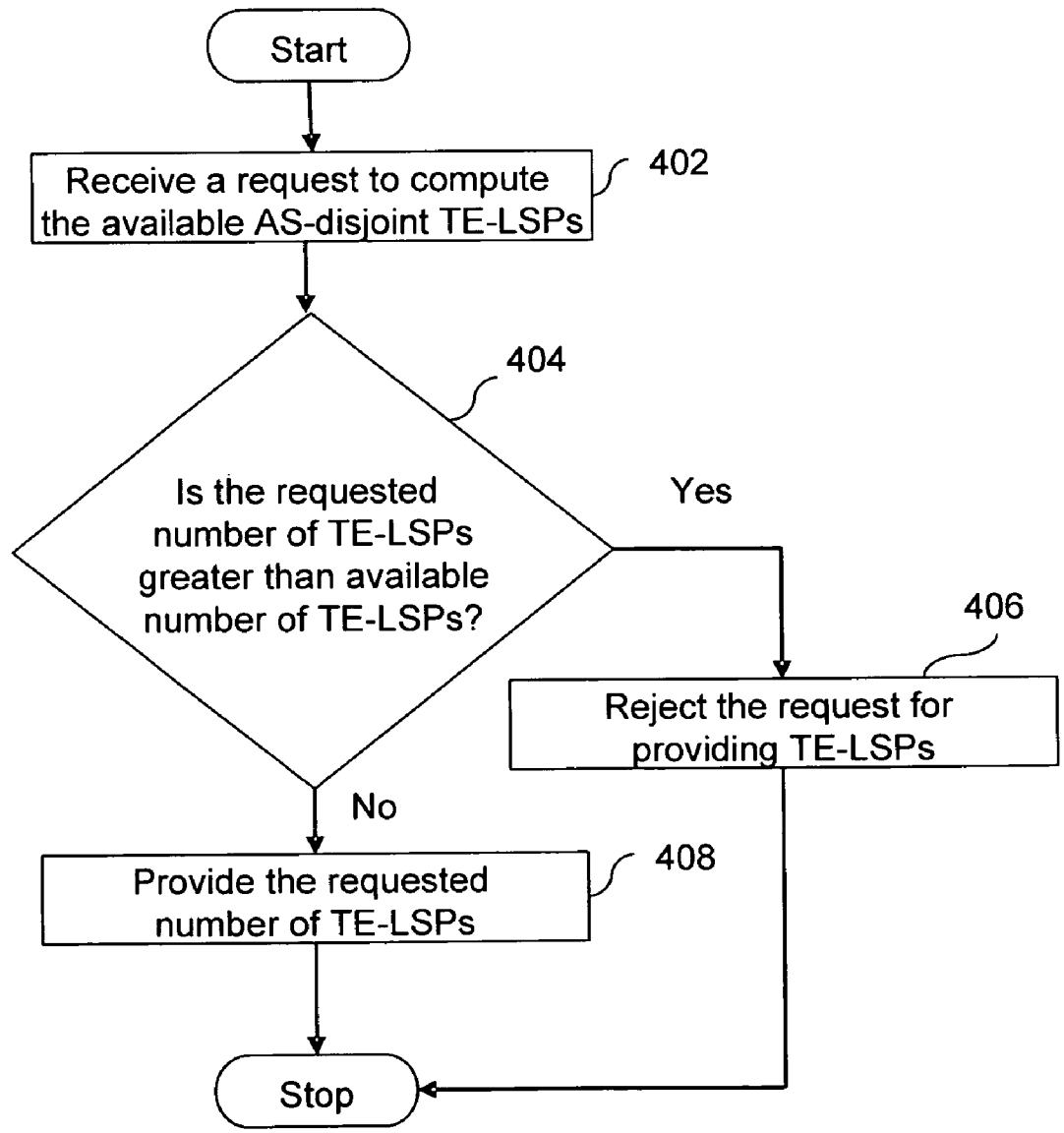
FIG. 4 is a flow diagram illustrating a method for sending a response to an AS for computed AS-disjoint TE-LSPs in accordance with an embodiment of the invention.

FIG. 4 is a flow diagram, illustrating a method for sending the response to AS 106 for the computed AS-disjoint TE-LSPs, in accordance with an embodiment of the present invention. A head end AS receives a request for a selected number, greater than two, of TE-lSPs. The AS forwards the request to PCE 202 computes the available number of AS-disjoint TE-LSPs as indicated at 402. Subsequently, at 404, PCE 202 checks if the requested number of AS-disjoint TE-LSPs is greater than the available number of AS-disjoint TE-LSPs. If the requested number of the AS-disjoint TE-LSPs is greater than the available number of AS-disjoint TE-LSPs, PCE 202 rejects the request to provide the AS-disjoint TE-LSPs, as indicated at 406.

To illustrate, if PCE 202 receives a request for computing 'N' AS-disjoint TE-LSPs, but only 'M' AS-disjoint TE-LSPs are available, where M is less than N, then PCE 202 rejects the request. In an embodiment of the invention, PCE 202 provides the available number of AS-disjoint TE-LSPs if the requested number of the AS-disjoint TE-LSPs is greater than the available number of AS-disjoint TE-LSPs.

At 408, PCE 202 provides the requested number of AS-disjoint TE-LSPs if the requested number of the AS-disjoint TE-LSPs is less than the available number of AS-disjoint TE-LSPS. For example, if PCE 202 receives a request for computing N AS-disjoint TE-LSPs, and M AS-disjoint TE-LSPs are available using the AS-level topology, where M is greater than N, then PCE 202 provides the requested N number of TE-LSPs.

More specifically, after the head-end AS's PCE receives the request for computing a selected number, such as N, AS-disjoint LSPs, the PCE deduces N disjoint paths with each AS representing a node on the path, as required. The PCE may whittle down the number of disjoint paths to a set of M paths where M>N. The choice of which N paths among the set of M paths is left to the locally configured policies. If M<N, then the request is rejected and information sent of such rejection to the head-end LSR requesting the AS-disjoint paths. Assuming M>N, The PCE would then compute k paths hop by hop (literally router by router) for each of the TE-LSPs, for the current AS of whom it is the resident PCE, where k relates to the number of paths required to reach (t) Autonomous System Boundary Routers (ASBRs), such that (t) ASBRs help reach N ASs from the head-end LSR. Thus, k could be <N and (t) less than N. In the worst case, k could be =N and/or (t) also =N.

Within the head-end AS, k router by router LSP sub-segments connecting the head-end AS to different AS-disjoint TE-LSPs may be shared among the N AS-disjoint TE-LSPs to be constructed. For each of the N AS-disjoint paths, the PCE formulates a route consisting of ASs, such as by way of illustration, A1, A2 . . . An which are to partake in each AS-disjoint TE-LSP. The number of ASes within this set may vary for each AS-disjoint TE-LSP.

Consider, by way of illustration, the set of N AS-disjoint paths to be named P1 . . . PN. For each of the N AS-disjoint paths P1 . . . PN, the head-end AS's PCE contacts PCE(j) where j=1 to N for each path P(j), to construct the AS-disjoint TE-LSP in its respective domain AS(b) where AS(b) is a member of the set A1 . . . An, for path P(j).

This process is repeated as the computation branches from the head-end AS and bounds/travels until the tail-end AS is reached on each of their respective paths P(j) where j=1 to N. If the process fails at any of the stages then notification is sent back to the head-end PCE and from thereon to the head-end LSR to inform it about such failure. Once confirmation of the complete setup of the AS-disjoint LSPs is completed by the downstream PCEs then the LSPs are ready for setup through appropriate signaling.

Note that although there is only one illustrated tail end AS, there may be one or, in other embodiments, more than one tail-end AS. The criterion for an tail end or exit AS in the original path computation request from the head-end LSR could have specified that a merge on PCE-determined specific tail-end AS or it could have specified that multiple tail-end ASs through which the destination is reachable, are to be accommodated in the computation. If there exists the former specification (requiring a single exit AS), the path computation at the exit AS could/may merge the multiple AS-disjoint TE-LSPs thus splicing them together. The exact nature of such merge is typically dictated by policies at the exit AS. Alternatively, the specification is sent as additive information in the path computation request to the PCE at the exit AS. If the latter specification (requiring, if necessary, more than one exit AS), the number of exit ASs could be k where k<number of AS-disjoint TE-LSPs to be computed, hence appropriate policies then dictate how the merging of the N AS-disjoint TE-LSPs are to be merged into k Exit ASes.

Figure 5:
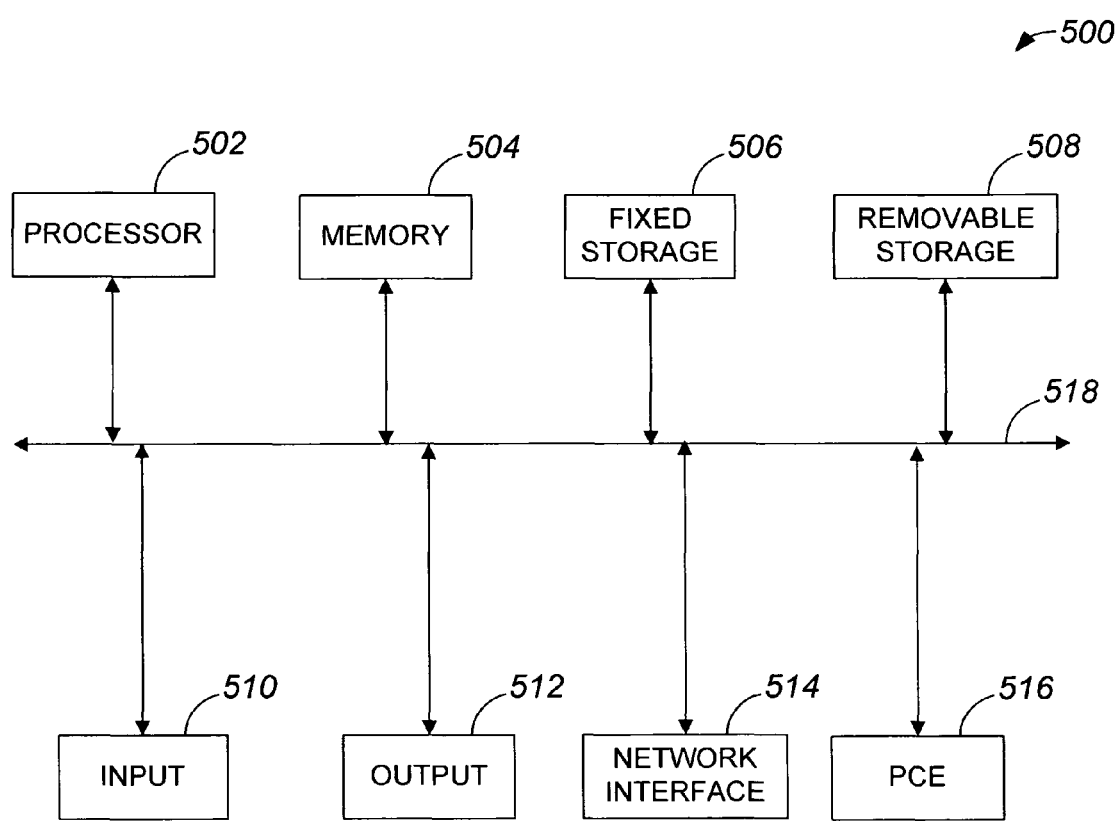
FIG. 5 illustrates a network device implementing an embodiment of the present invention.

FIG. 5 shows a block diagram of components that may be present in one or more of a computing device that implement embodiments of the present invention. Specifically, a network device 500 includes a processor 502 that executes instructions from computer programs, including operating systems. Processor 502 may be utilized to allow network management applications and user scripts, for example, to execute. Although processor 502 typically has memory caches, processor 502 may utilize memory 504, which may store instructions or computer code and data to implement embodiments of the present invention.

The processor may be a dual core or multicore processor, where there are multiple processor cores on a single integrated circuit. The network device may also be part of a distributed computing environment. In a distributed computing environment, individual computing systems are connected to a network and are available to lend computing resources to another system in the network as needed.

A fixed storage 506 may store computer programs and data. Fixed storage 506 is typically persistent, and provides more storage than memory 504. One example of a typical fixed storage 506 for a network management application comprises multiple hard drives, although it should be understood that fixed storage 506 maybe be any suitable component. A removable storage 508 provides mobility to computer programs and/or data that are stored thereon. Removable storage 508 may include, but is not limited to, mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Memory 504, fixed storage 506 and removable storage 508 provide examples of computer-readable storage media that may be utilized to store and retrieve computer programs incorporating computer codes or code devices that implement the invention, data for use with the invention, and the like. An input device 510 allows a user to interface with network device 500. Input device 510 may be a keyboard, a mouse, buttons, dials, or any other suitable input mechanism. An output device 512 generally allows network device 500 to provide output to the user. Output device 512 may include, but is not limited to, devices such as monitors, display screens, LEDs, printers, or substantially any other output mechanism.

Additional peripherals may be connected to the network device 500 through a network interface 514 or other interface such as serial, parallel, or universal serial bus (USB) interfaces. For example, PCE 516 may be coupled to network device 500 through network interface 514.

Network interface 514 typically allows network device 500 to interface with a network to which it is connected. The system bus architecture of network device 500 is represented by arrows 518. The components shown in FIG. 5 may be found in many network device. However, components may be added, deleted, and combined without departing from the spirit or the scope of the present invention. For example, fixed storage 506 may be a file server that is accessed through a network connection. Thus, FIG. 5 is for illustration purposes and is not limiting.

In one embodiment, network device 500 utilizes PCE 516 to calculate the primary and the secondary TE-LSP. PCE 516, associated with the head end AS, computes the primary and the backup paths based on the network topology obtained by either actively or passively participating or listening to BGP updates broadcast by its peers.

Embodiments of this invention are applicable to Multi Protocol Label Switching (MPLS) traffic engineering across multiple ASs. MPLS is a method for increasing the speed of network traffic flow by inserting information about a specific TE-LSP. MPLS uses a base technology for using label switching in conjunction with network layer routing and for the implementation of that technology over various link level technologies. MPLS traffic engineering across ASs is used in large enterprises and services providers.

Embodiments of the present invention provide a method for computing AS-disjoint inter-AS TE-LSPs. Computation of AS-disjoint TE-LSPs provides protection against lost packets and network disruptions as well as load balancing across TE-LSPs. In one embodiment of the invention, if an intermediate AS 106 malfunctions during the process of forwarding traffic, an AS-disjoint TE-LSP is used for protection purposes. In another embodiment of the invention, if a part of network traffic requires priority, the rest of the traffic is load balanced on the other AS-disjoint TE-LSPs.

According to embodiments of the present invention, a method for computing Autonomous System (AS)-disjoint inter-AS Traffic Engineering Label Switched Paths (TE-LSPs) in a network is provided. The method comprises receiving a request for computing a requested number of AS-disjoint TE-LSPs, wherein the request is received from the AS; computing an available number of AS-disjoint TE-LSPs; and sending a response to the AS, wherein the response comprises the computed AS-disjoint TE-LSPs.

According to embodiments of the present invention, a method for computing Autonomous System (AS)-disjoint inter-AS Traffic Engineering Label Switched Paths (TE-LSPs) in a network is provided. The method comprises extracting prefixes from a Border Gateway Protocol (BGP) routing table, wherein each prefix provides a strand of information comprising an AS path; combining the strands of information from the BGP routing table; computing an AS-level topology; and providing the AS-level topology as an input to a Path Computation Element (PCE) for a computation of AS-disjoint TE-LSPs.

In another embodiment of the invention, an apparatus for computing Autonomous System (AS)-disjoint inter-AS Traffic Engineering Label Switched Paths (TE-LSPs) in a network is provided. The apparatus comprises Autonomous Systems (ASs) adapted for sending a request for a computation of Traffic Engineering Label Switched Path (TE-LSP); a computing device adapted for computing the AS level topology; and Path Computation Elements (PCEs) adapted for computing the TE-LSPs.

In other embodiments, an apparatus for computing Autonomous System (AS)-disjoint inter-AS Traffic Engineering Label Switched Paths (TE-LSPs) in a network is provided. The apparatus comprises a processor for executing instructions and a machine-readable medium that includes instructions executable by the processor. The instructions enable the apparatus to receive a request for computing a requested number of AS-disjoint TE-LSPs, wherein the request is received from the AS; to compute an available number of AS-disjoint TE-LSPs; and to send a response to the AS, wherein the response comprises the computed AS-disjoint TE-LSPs.

Although specific protocols have been used to describe embodiments, other embodiments can use other transmission protocols or standards. Use of the terms 'router', "source" and 'destination' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Although embodiments have been describe in terms of TE-LSP, embodiments of the present invention may be used in 'label switched' or 'MPLS' networks can include any type of device, operation, or other process. The present invention can operate under any protocol using a data-carrying mechanism that emulates some properties of a circuit-switched network over a packet-switched network. While TE and label switched paths operates at an OSI model layer that is generally considered to lie between the data link layer (Layer 2) and the network layer (Layer 3) the present invention is not restricted to a particular layer or to the OSI mode. Indeed, embodiments of the present invention can be used to carry many different kinds of traffic, including IP packets, as well as native ATM, SONET, and Ethernet frames.

Any suitable programming language can be used to implement the algorithm of the present invention including C, C++, Java, assembly language, etc. Different programming techniques such as procedural or object oriented can be employed. The algorithm can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc.

A 'computer' or a 'computing device' for purposes of embodiments of the present invention may include any processor-containing device, such as a mainframe computer, personal computer, laptop, notebook, microcomputer, server, personal network device or 'PIM' (also referred to as a personal information manager), smart cellular or other phone, so-called smart card, set-top box, or any of the like. A 'computer program' or 'algorithm' may include any suitable locally or remotely executable program or sequence of coded instructions inserted into a computer, which are well known to those skilled in the art. Stated more specifically, a computer program includes an organized list of instructions that, when executed, causes the computer to behave in a predetermined manner.

A 'computer readable medium' or 'memory' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for computing Autonomous System (AS)-disjoint inter-AS Traffic Engineering Label Switched Paths (TE-LSPs) in a network, the method comprising:
   receiving a request for computing a requested number of AS-disjoint TE-LSPs,
   wherein the request is received from the AS;
   computing an available number of AS-disjoint TE-LSPs using strands of network information that provide AS-level topology of the network;
   sending a response to the AS, wherein the response comprises the computed AS disjoint TE-LSPs; and
   providing the requested number of AS-disjoint TE-LSPs if an available number of AS-disjoint TE-LSPs is greater than requested number of AS-disjoint TE-LSP.

2. The method of claim 1, wherein the request is for computing a requested number of
   Partially AS-disjoint TE-LSPs.

3. The method of claim 1, wherein computing the AS-disjoint TE-LSPs comprises:
   computing a sectional TE-LSP using the AS level topology.

4. The method of claim 3, wherein computing the AS level topology comprises:
   combining strands of information from a Border Gateway Protocol (BGP) routing table, wherein each strand comprises an AS path information.

5. The method of claim 1, wherein sending the response comprises:
   sending a response to the AS, wherein the response comprises a sectional TE LSP.

6. The method of claim 1, wherein sending the response to the AS comprises:
   rejecting a request for providing the requested number of AS-disjoint TE-LSPs if an available number of AS-disjoint TE-LSPs is less than the requested number of AS-disjoint TE-LSPs.

7. The method of claim 1, wherein sending the response to the AS TE-LSPs comprises:
   providing an available number of AS-disjoint TE-LSPs, if the available number of AS-disjoint TE-LSPs is less than the requested number of AS-disjoint TE-LSPs.

8. The method of claim 1, wherein the sending the response to the AS comprises:
   sending the requested number of AS-disjoint TE-LSPs or partially AS-disjoint TE-LSPs to the AS.

9. A system for computing Autonomous System (AS)-disjoint inter-AS Traffic Engineering Label Switched Paths (TE-LSPs) in a network, the system comprising:
- means for receiving a request for computing a requested number of AS-disjoint TE-LSPs, wherein the request is received from the AS;
- means for computing an available number of AS-disjoint TE-LSPs;
- means for sending a response to the AS, wherein the response comprises the computed AS-disjoint TE-LSPs; and
- means for providing the requested number of AS-disjoint TE-LSPs if an available number of AS-disjoint TE-LSPs is greater than requested number of AS-disjoint TE-LSP.

10. An apparatus for computing Autonomous System (AS)-disjoint inter-AS Traffic Engineering Label Switched Paths (TE-LSPs) in a network, the apparatus comprising:

- a processing system including a processor coupled to a memory;
- a machine-readable medium including instructions executable by the processor comprising:
- one or more instructions for receiving a request for computing a requested number of AS-disjoint TE-LSPs, wherein the request is received from the AS;
- one or more instructions for computing an available number of AS-disjoint TE LSPs;
- one or more instructions for sending a response to the AS, wherein the response comprises the computed AS-disjoint TE-LSPs; and
- one or more instructions for providing the requested number of AS-disjoint TE LSPs if an available number of AS-disjoint TE-LSPs is greater than requested number of AS disjoint TE-LSP.

* * * * *